US009584785B2

(12) United States Patent
Nakayama (10) Patent No.: US 9,584,785 B2
(45) Date of Patent: Feb. 28, 2017

(54) ONE PASS VIDEO PROCESSING AND COMPOSITION FOR HIGH-DEFINITION VIDEO

(71) Applicant: Microsoft Corporation, Redmond, WA (US)

(72) Inventor: Kazuyuki Nakayama, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/055,870

(22) Filed: Oct. 16, 2013

(65) Prior Publication Data
US 2014/0043536 A1    Feb. 13, 2014

Related U.S. Application Data

(63) Continuation of application No. 12/136,771, filed on Jun. 11, 2008, now Pat. No. 8,570,441.

(51) Int. Cl.
*H04N 5/14* (2006.01)
*H04N 9/64* (2006.01)
(Continued)

(52) U.S. Cl.
CPC ............ *H04N 9/76* (2013.01); *H04N 7/013* (2013.01); *G09G 5/006* (2013.01); *H04N 7/012* (2013.01); *H04N 7/0112* (2013.01)

(58) Field of Classification Search
USPC ........ 345/592, 604, 660, 698, 699; 348/441, 348/445, 553–558, 563–569, 584–592,
(Continued)

(56) References Cited

U.S. PATENT DOCUMENTS 6,674,479 B2    1/2004  Cook et al.
6,714,253 B2 *  3/2004  Kim ..................... H04N 5/4401
                                                          348/554
(Continued)

OTHER PUBLICATIONS

Chan Zachary, "Blu-Ray and HD DVD: Is Your PC Ready?—Part 2: Performance", Date: Jan. 19, 2007, 3 Pages, http://www.hardwarezone.com/articles/view.php?cid=11&id=2161.
(Continued)

*Primary Examiner* — Nasser Goodarzi
*Assistant Examiner* — Fred Peng
(74) *Attorney, Agent, or Firm* — Sunah Lee; Dan Choi; Micky Minhas (57) ABSTRACT

A video composition model that provides a set of application programming interfaces (APIs) to set device contexts, and determine capabilities of graphics hardware from a device driver. After the model determines a configuration, the model determines input video stream states applicable to frame rates, color-spaces and alpha indexing of input video streams, interactive graphics, and background images. The model prepares the input video frames and reference frames, as well as a frame format and input/output frame index information. The input video streams, interactive graphics and background images are processed individually and mixed to generate an output video stream.

20 Claims, 6 Drawing Sheets

(51) Int. Cl.
*H04N 9/74* (2006.01)
*G09G 5/02* (2006.01)
*H04N 9/76* (2006.01)
*G09G 5/00* (2006.01)
*H04N 7/01* (2006.01)

(58) Field of Classification Search
USPC .......................................... 348/597–599, 734
See application file for complete search history.

(56) References Cited

U.S. PATENT DOCUMENTS

| | | | |
|---|---|---|---|
| 6,724,433 B1 | 4/2004 | Lippman | |
| 6,903,753 B1 | 6/2005 | Gray et al. | |
| 7,136,414 B2 | 11/2006 | Yuan et al. | |
| 7,139,002 B2 | 11/2006 | Estrop | |
| 7,219,352 B2 | 5/2007 | Estrop | |
| 7,295,249 B2 * | 11/2007 | Holland | H04N 5/44504 345/539 |
| 7,463,311 B2 | 12/2008 | Flesch et al. | |
| 7,486,337 B2 | 2/2009 | Bian | |
| 2004/0190617 A1 | 9/2004 | Shen et al. | |
| 2005/0069130 A1 * | 3/2005 | Kobayashi | H04L 29/06 380/201 |
| 2006/0013077 A1 * | 1/2006 | Mesarovic | G10L 19/18 369/30.01 |
| 2006/0146196 A1 * | 7/2006 | Suenaga | H04N 1/603 348/624 |
| 2007/0098080 A1 | 5/2007 | Diard et al. | |
| 2007/0116128 A1 | 5/2007 | Evans et al. | |
| 2007/0157268 A1 | 7/2007 | Girish et al. | |
| 2007/0204318 A1 | 8/2007 | Ganesh et al. | |
| 2007/0258653 A1 * | 11/2007 | Van Heesch | H04N 5/208 382/248 |

OTHER PUBLICATIONS

Triolet, Damien, "Report: Which Graphic Cards are Best Suited for HD Video?", Date: Oct. 11, 2007, 3 Pages, http://www.behardware.com/articles/690-2/report-which-graphic-cards-are-best-suited-for-hd-video.html.
"ATI Avivo against Nvidia PureVideo", Date: Nov. 25, 2005, 6 Pages, http://forums.guru3d.com/showthread.php?t=160706.
"NVIDIA PureVideo Technology", 1 Page, http://www.nvidia.com/page/pg_20041215177473.html.
U.S. Appl. No. 12/136,771, filed Jun. 11, 2008, Nakayama.

* cited by examiner

ONE PASS VIDEO PROCESSING AND COMPOSITION FOR HIGH-DEFINITION VIDEO

RELATED APPLICATIONS

This Application is a Continuation of and claims benefit from U.S. patent application Ser. No. 12/136,771 that was filed on Jun. 11, 2008, and that is incorporated herein by reference in its entirety.

BACKGROUND

Operating systems provide applications access to graphics hardware for video processing using specified application programming interfaces (APIs), Certain CPU-intensive operations, such as inverse discrete cosine transform, motion compensation, de-interlacing, color correction, video capturing and video processing operations may be performed using the graphics hardware to be accelerated. This video acceleration works in conjunction with a video rendering model used by the graphics hardware (video card).

However, some video acceleration systems provide only limited support for High-Definition video, such as Blu-ray, HD DVD and ISDB-T. Some of the limitations include support for only a single stream of video, support for either multiple YCbCr streams or a single RGB stream, interlacing and de-interlacing of only the main video stream, unsupported composition primitives, limited background support, and others. The limitations make it difficult to provide, for example, a High-Definition video player because of inefficiencies in the 3D graphics pipeline. As such, YCbCr streams and RGB streams cannot be composed in a single pass, and the sub video stream requires a pre-processing stage for de-interlacing. In addition, the streams cannot be different frame rates, and the output frame rate is assumed the same as the input frame rate that is not applicable to telecined film source.

Due to the limitations and the missing functionalities, software vendors and hardware vendors are bypassing the APIs and using specifically designed private interfaces and graphics hardware. Software vendors are using a D3D shader for video processing and composition, which is inefficient and does not support low-end graphics hardware and mobile systems. Hardware vendors are shipping video cards with dedicated video processing hardware. Often the vendors encounter difficulties because of the specifics of their hardware and/or software implementations.

SUMMARY

A video composition model that provides a set of application programming interfaces (APIs) to ascertain device contexts and determine capabilities of graphics hardware from a device driver. After the model determines a configuration, the model determines input video stream states applicable to frame rates, color-spaces and alpha indexing of input video streams, interactive graphics, and background images. The model prepares the input video frames and reference frames, as well as a frame format and input/output frame index information. The input video streams, interactive graphics and background images are processed individually and mixed to generate an output video stream.

In some implementations, a method of processing input video streams may include receiving input video streams, each video stream having a predefined frame rate and color space; exposing application programming interfaces (APIs) to provide access to graphics hardware; processing each video stream in accordance with characteristics of the video stream, independently of other video streams; mixing processed input video streams by alpha blending the processed video streams and converting the processed input video streams to an output frame rate to generate an output video stream; and outputting the output video stream.

In some implementations, a video composition modeling system may include a graphics kernel that exposes application programming interfaces (APIs) to access graphics hardware, a video input stage that receives input video streams, a processing stage that performs processing on a per-plane and per-pixel alpha basis for each input stream, a mixing stage that mixes and alpha blends the input video streams to generate an output video stream, and an output stage to output the output video stream.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Implementations described below provide a flexible video composition model within an operating system, such as MICROSOFT WINDOWS. The video composition model provides support for High-Definition formats, such as Blu-ray that are controlled by HDMV or BD-J (Java for BD). In addition, digital High-Definition broadcast standards, such as ISBD-T with BML, may be supported.

Figure 1:
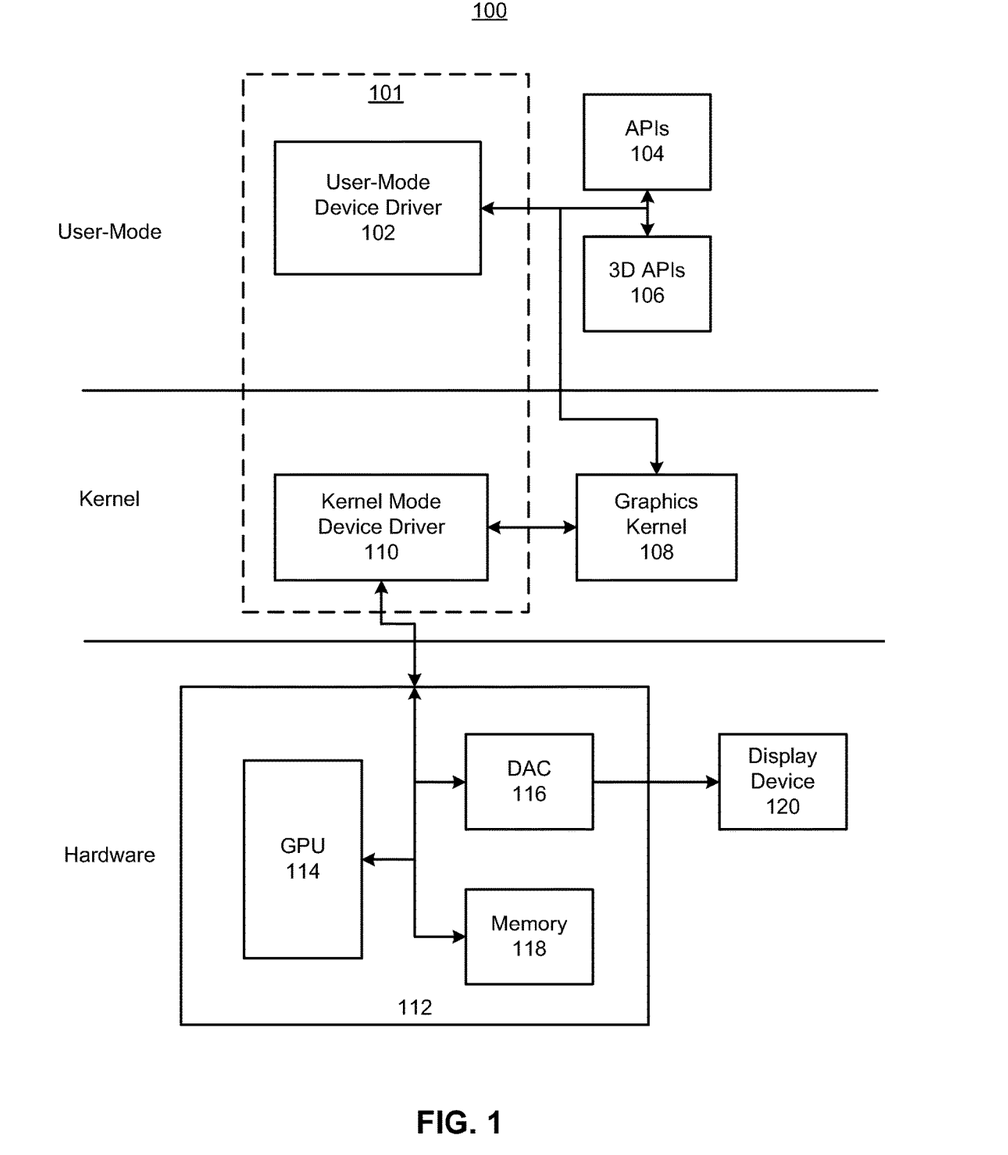
FIG. 1 is a block diagram of an implementation of a system architecture for graphics processing.
Figure 6:
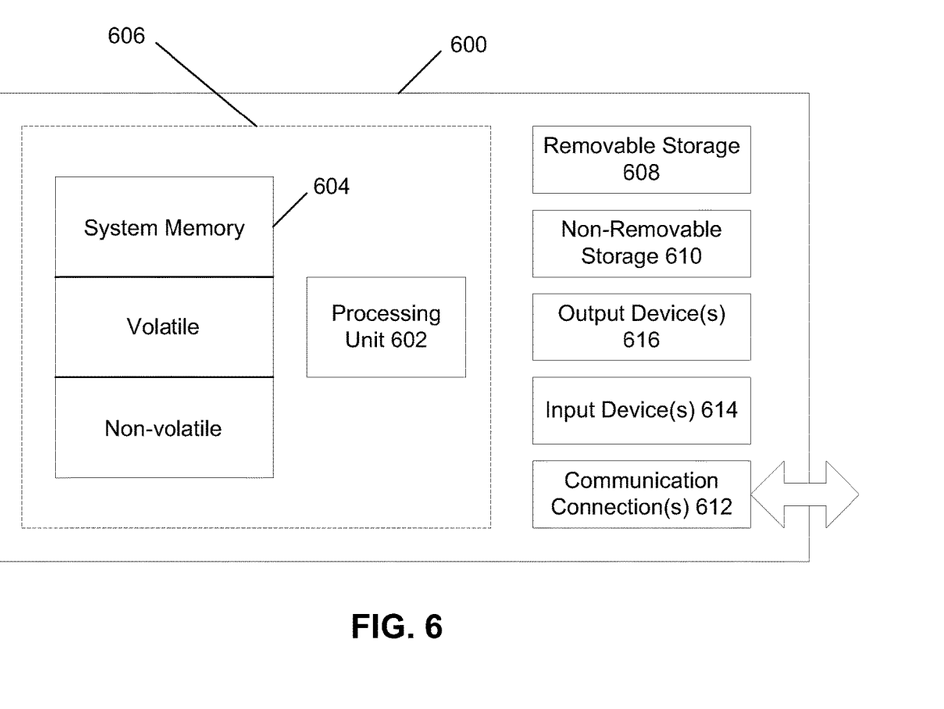
FIG. 6 shows an exemplary computing environment.

FIG. 1 is an illustrative block diagram depicting certain exemplary elements/functions that are employed in rendering video signals within a computing environment. An exemplary computing environment is illustrated in FIG. 6. These various elements and/or functions may be implemented in hardware and/or software, as applicable.

Video data, such as a video stream or graphics may be input to a computing device for display on the display device 120. The computing device may include hardware, such as a graphics device 112 that cooperates with a software device driver 101 that may include in some implementations, a user-mode device driver 102 and a kernel-mode device driver 110 that collectively operate with the graphics device 112. Thus, the device driver 101 may be part of the user mode logic or kernel mode logic with respect to the operating environment of a graphics device 112. The user-mode device driver 102 and the kernel-mode device driver 110 are typically written by a hardware vendor such that the graphics device 112 is operable within an operating system, such as MICROSOFT VISTA.

The operating system may provide user-mode APIs 104 and a 3D APIs 106 that provide interfaces to the graphics device 112. The APIs 104 may be used to interface with an operating system graphics kernel 108, which in turn interfaces with the kernel-mode driver 110 and the graphics device 112. Exemplary APIs 104 may be the DIRECTX application programming interface, available from Microsoft Corporation, Redmond, Wash. The 3D APIs 106 may be the DIRECT3D application programming interface available from Microsoft, and may be use to render three dimensional graphics through exposed interfaces to the graphics device 112. The 3D APIs 106 expose the capabilities of 3D graphics hardware, including z-buffering, anti-aliasing, alpha blending, mipmapping, atmospheric effects, and perspective-correct texture mapping.

In the example of FIG. 1, video data may be provided to a graphics processor unit (GPU) 114, which is configurable to perform processing of the video data, as will be described in detail below. The output from GPU 114 is provided to the video memory 118. When the video memory 118 is read, the resulting data may be then provided to a digital to analog converter (DAC) 116, which outputs a corresponding analog video signal suitable for display by a display device 120. In some implementations, the display device 120 may be configured to process the digital data from video memory 118 without the need for DAC 116. As illustrated, the graphics device 112 may include the GPU 114, video memory 118 and DAC 116. In some implementations, the graphics device 112 may take the form of a video graphic card that can be configured within a PC or like device.

In some implementations, the video memory 118 may be virtualized. As such, if there is a demand for memory and the memory is all allocated, then secondary storage source may be used, and the operating system manages all the paging algorithms and mechanics for faulting in the secondary storage into the primary storage when it needs to be operated on. For example, if the primary storage is video memory 118, the secondary storage may be system memory within a computing device.

In some implementations, the GPU 114 may be scheduled (preempted). Thus, the usage of the GPU 114 may be managed giving different computation requirements of applications requesting it.

The configuration shown in FIG. 1 is but one example of a video data processing apparatus. Those skilled in the art will recognize that other possible configurations may also benefit from the methods and apparatuses of the present invention.

Figure 2:
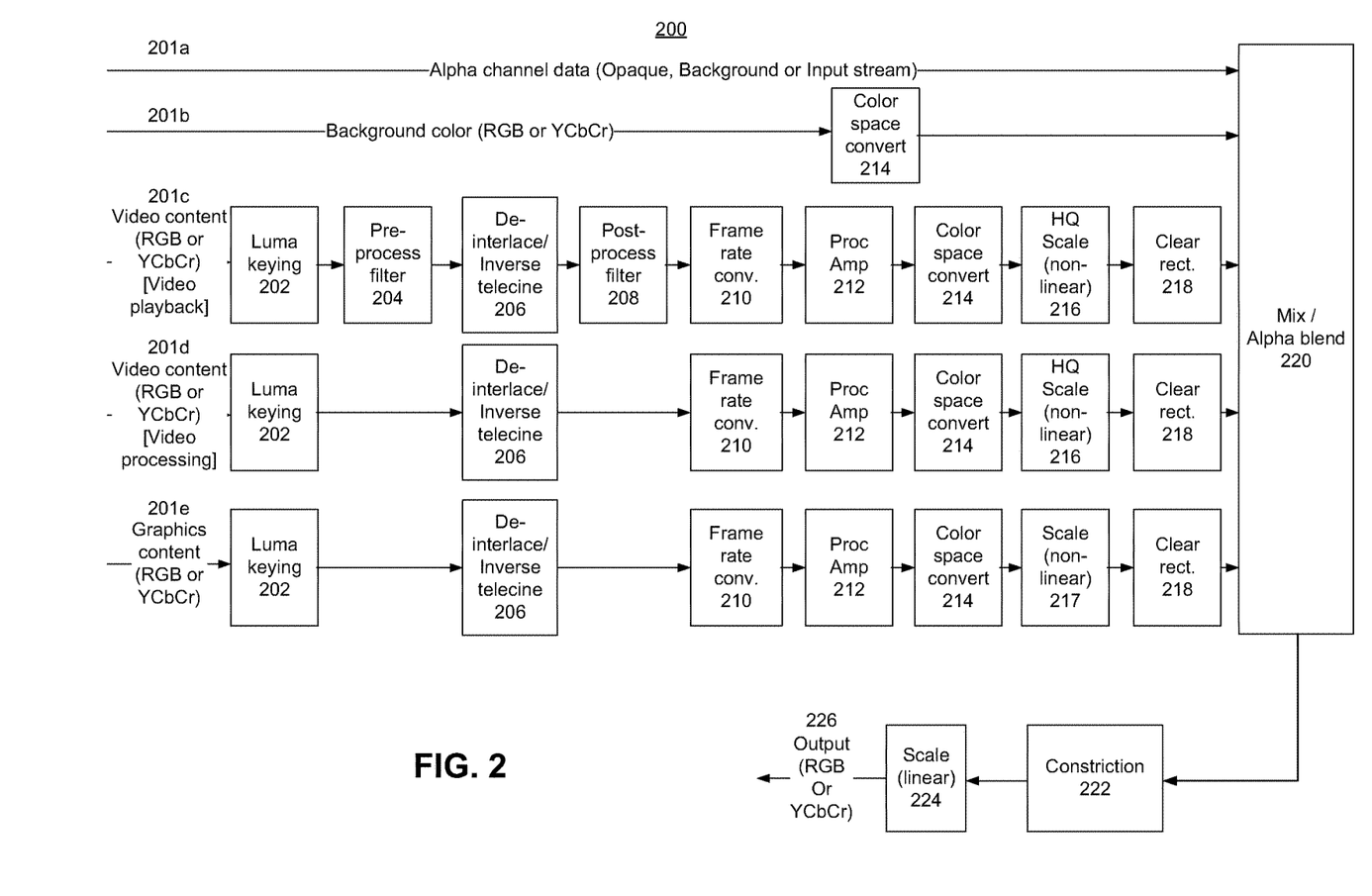
FIG. 2 illustrates a block diagram of an exemplary video composition model.

FIG. 2 illustrates a block diagram of an exemplary video composition model 200. The model 200 provides a standardized API and DDI as well as the data structures and definitions, described below. A video playback application may utilize the video composition model 200 by creating device contexts and by querying the capabilities of the graphics device 112 from the device driver 101. Once the video application determines the configuration, the video application initializes the process and stream states before video processing begins within the video composition model 200. The video application may also prepare the frames and the reference frames, as well as the frame format and input/output frame index information for the input streams to be video processed to the output by the video composition model 200.

The video composition model 200 may receive input streams 201c, 201d and 201e in either RGB or YCbCr (YUV) format and compose the streams in a single pass. For example, the video streams 201c, 201d and 201e may be in a YCbCr format where interactive graphics streams are RGB format. Each video stream 201c, 201d and 201e may be either progressive or interlaced stream. For example, a main video stream (201c) may be a progressive film source and a sub video stream (201d) may be an interlaced video source. Each stream 201c, 201d and 201e may have Clear Rectangle (e.g., up to 32 rectangles shared) and Luma Keying. For example, High-Definition content may have bonus features that use these composition primitives. The video composition model 200 may support the wide gamma standard xvYCC, and the device driver 101 may optimize the color conversion to the output device context by setting a flag.

If the output has alpha channel data 201a, the video composition model 200 may provide options to fill out with an opaque value, fill out with an alpha value specified in the background color, copy from an input stream, or remain unchanged. A background color 201b may be specified in either RGB or YCbCr color space. The background color 201b may be color converted to the output color space if it is input in a different color space. Because each input stream 201c, 201d and 201e may be any content, each stream may be either video content or graphics content, and may be in either RGB or YCbCr color space. For example, the video stream at the lowest z-order may be used for a background image. The video content may be optimized to either video playback or video processing.

In some implementations, each stream 201c, 201d and 201e may have an individual frame rate. For example, the main video may be a 24p (progressive) film source, the sub video may be 60i (interlaced) video source, and the interactive graphics may be 10 fps. They may all be composed to the output at either 24 fps or 60 fps. The output frame rate may be configured to be less than the input frame rate. For example, a 24p film source telecined to 60i may be reversed to 24 fps rather than 60 fps with 3:2 repeat frames.

In some implementations, each stream 201c, 201d and 201e may have individual filter settings. For example, the main video stream 201c may be dimmer, the sub video stream 201d may have noise reduction set to "on," and the interactive graphics stream 201e may have all filters "off."

The video composition model 200 may provide interfaces such that a video application and the kernel-model driver 110 may establish a proprietary method that may be used for non-standardized content protection. The processing may have individual proprietary context associated with it as well. For example, the video application may enable proprietary content protection to the main video stream, but not the sub video stream and interactive graphics stream. The video composition model 200 also preserves extended wide gamut data (xvYCC) through the pipeline to the output.

According to some implementations, interfaces may be provided to split the state parameters and the non-state parameters (see BLT_STATE and STREAM_STATE below) related to video memory. The device driver 101 may leverage this by only have to know the state change when the state is actually being changed. The video application may leverage this by validating the specific state at the time when state is being changed.

Referring to FIG. 2, a luma keying block 202 provides a range of upper and lower luma key value limits within which correspondent pixels of an input frame are treated as transparent. In video processing, any distinct attribute of a group of pixels may be the basis for keying. The luma keying block 202 keys on a brightness value. A pixel with no brightness (black) has a digital luminance value of 0, and a pixel that is fully bright (white) will have a value of 255.

A pre-process filter block 204 provides for video filtering that is performed prior de-interlacing. For example, a noise reduction filtering process may be performed in this block. Other examples of filtering include, but are not limited to smoothing, blending, motion masking, blurring, de-blocking, enhancing, etc. The video filters may be setup as digital filters, implement through mathematical operations applied to a transformed version of the input video signal. The transformation may be performed using a Fast Fourier or Discrete Cosine transformation on the input video signal, such that the frequency components may be manipulated.

A de-interlace/inverse telecine block 206 constructs a progressive frame from one or multiple interlaced frames. Interlaced frames are common in analog transmission. The de-interlace/inverse telecine block 206 may also inverse the telecine. Telecine accounts for the frame rate differences between motion pictures captured on film (e.g., 24 frames/sec) and standard video equipment (e.g., 30 frames/sec). As noted above, because the input streams may each have the same capabilities, any input stream can be interlaced. In some implementations, the input video streams may use the same de-interlacing method, but the cadence and frame rate may be different from stream to stream.

As noted above, the video application and the device driver 101 will be able to query the graphics device 112 to determine the capabilities of the graphics device 112 before processing begins (see CONTENT_DESC below) and the device usage (see DEVICE_USAGE below). As such, some implementations provide a mechanism to throttle the video application by throttling the reference surfaces provided to the de-interlace/inverse telecine block 206 so that the device driver 101 may fall back to a less complex de-interlacing method (e.g. adaptive de-interlacing falls back to bob de-interlacing). In some implementations, the video application may lower the frame rate dynamically by scheduling intentional frame drops (e.g., 60i to 30p, a half rate with blend de-interlacing).

A post-process filter block 208 provides various video filtering that is performed after de-interlacing. For example, edge enhancement filtering may be performed in this block.

A frame rate conversion block 210 may convert the frame rate by either repeating or interpolating the frames. The video composition model 200 allows the device driver 101 to expose a frame rate conversion (see CUSTOM_RATE_DATA below), which may be used in a playback scenario to maximize the presentation experience by up-converting the frame rate to higher frame rate. A down-conversion may be used to inverse telecine the video content in video processing scenarios to convert from telecined interlaced frames to the original progressive frames (e.g., convert 60i to 24p with reverse 3:2 pulldown).

A ProcAmp block 212 may provide various color adjustments and controls. The ProcAmp block 212 may be used to clean video signal components in standard definition or high definition video signals. ProcAmp controls may include, but are not limited to brightness, contrast, hue and saturation. Common ProcAmp features may include, but are not limited to adjusting sync amplitude, boosting low light level video, reducing video wash out, and chroma clipping.

A color space conversion block 214 may convert from one color space or color matrix to another if the input stream is different than the output color space. For example, RBG may be converted to YCbCr and vice versa using digital conversion algorithms.

A high quality (HQ) scale block 216 or scale block 217 may perform stretching or shrinking of the video and/or graphics content depending on the input frame size and destination size. The scale blocks 216 and 217 may perform an process for converting video signals between one resolution/aspect-ratio to another resolution/aspect-ratio. For example, the content may be "upscaled" or "upconverted," or converted from a lower resolution (Standard Definition) to a higher resolution (High Definition) by the HQ scale block 216. In some implementations, the scale blocks 216 and 217 provide linear scaling and non-linear scaling. The non-linear scaling may use parameters such as the input frame size, output size, input pixel aspect ratio and output pixel aspect ratio.

A clear rectangle block 218 provides rectangles in which the correspondent pixels of rectangles in the input stream are treated as transparent. A clear rectangle may be a region defined by a height and width.

A mix block 220 may perform alpha blending of the input streams on top of a background color. Alpha blending may be performed within the mix block, and is the process of combining a translucent foreground color with a background color to produce a new blended color. The degree of the foreground color's translucency may range from completely transparent to completely opaque. If the foreground color is completely transparent, the blended color will be the background color. Conversely, if the foreground color is completely opaque, the blended color will be the foreground color. The translucency may range within the range of transparent to opaque, in which case the blended color is computed as a weighted average of the foreground and background colors.

In some implementations, each input stream may have a per-plane alpha, a per-pixel alpha, and a per-palette index alpha. If an output surface has alpha channel data (e.g., ARGB32), the video composition model 200 provides an interface for the video application to specify how the alpha channel data to be filled out on the target rectangle. An alpha channel is an additional eight bits used with each pixel in a 32-bit graphics system that may represent 256 levels of translucency. Black and white represent opaque and fully transparent, while various gray levels represent levels of translucency.

A constriction block 222 performs down-sampling on a composed frame in order to restrict the image resolution. The constriction block 222 may be used to implement content protection schemes where, e.g., high-definition content is scaled to standard-definition if an output device does not provide authorized protection mechanisms.

A scale block 224 scales the output to a resolution appropriate for an output device, such as the display device 120. The scale block 224 provides an output video stream 226, which may be formatted in accordance with one of the input streams 201*c*, 201*d* and 201*e*, or in accordance with a device, such as the display device 120.

API Function

To provide access to the above features of the video composition model 200, APIs may be provided to enable the video application and/or device driver 101 to provide information and data to the video composition model 200. Below is a non-limiting description of the public interfaces exposed by the video composition model 200.

```
HRESULT DXVAHD_CreateDevice(
    IDirect3Ddevice9Ex*            pD3Ddevice,
    const DXVAHD_CONTENT_DESC*     pContentDesc,
    DXVAHD_DEVICE_USAGE            Usage,
    PDXVAHDSW_Plugin               pPlugin,
    IDXVAHD_Device**               ppDevice
);
```

API Interfaces

```
HRESULT IDXVAHD_Device::CreateVideoSurface(
    UINT                    Width,
    UINT                    Height,
    D3DFORMAT               Format,
    D3DPOOL                 Pool,
    DWORD                   Usage,
    DXVAHD_SURFACE_TYPE     Type,
    UINT                    NumSurfaces,
    IDirect3Dsurface9**     ppSurfaces,
    HANDLE*                 pSharedHandle
);
HRESULT IDXVAHD_Device::GetVideoProcessorDeviceCaps(
    DXVAHD_VPDEVCAPS*       pCaps
);
HRESULT IDXVAHD_Device::GetVideoProcessorOutputFormats(
    UINT                    Count,
    D3DFORMAT*              pFormats
);
HRESULT IDXVAHD_Device::GetVideoProcessorInputFormats(
    UINT                    Count,
    D3DFORMAT*              pFormats
);
HRESULT IDXVAHD_Device::GetVideoProcessorCaps(
    UINT                    Count,
    DXVAHD_VPCAPS*          pCaps
);
HRESULT IDXVAHD_Device::GetVideoProcessorCustomRates(
    const GUID*             pVPGuid,
    UINT                    Count,
    DXVAHD_CUSTOM_RATE_DATA* pRates
);
HRESULT IDXVAHD_Device::GetVideoProcessorFilterRange(
    DXVAHD_FILTER           Filter,
    DXVAHD_FILTER_RANGE_DATA* pRange
);
HRESULT IDXVAHD_Device::CreateVideoProcessor(
    const GUID*             pVPGuid,
    IDXVAHD_VideoProcessor  ppVideoProcessor
);
HRESULT IDXVAHD_VideoProcessor::SetVideoProcessBltState(
    DXVAHD_BLT_STATE State,
    UINT                    DataSize,
    const void*             pData
);
HRESULT IDXVAHD_VideoProcessor::GetVideoProcessBltState(
    DXVAHD_BLT_STATE        State,
    UINT                    DataSize,
    void*                   pData
);
HRESULT IDXVAHD_VideoProcessor::SetVideoProcessStreamState(
    UINT                    StreamNumber,
    DXVAHD_STREAM_STATE     State,
    UINT                    DataSize,
    const void*             pData
);
HRESULT IDXVAHD_VideoProcessor::GetVideoProcessStreamState(
    UINT                    StreamNumber,
    DXVAHD_STREAM_STATE     State,
    UNIT                    DataSize,
    void*                   pData
);
HRESULT IDXVAHD_VideoProcessor::VideoProcessBltHD(
    const IDirect3Dsurface9* pOutputSurface,
    UINT                    OutputFrame,
    UINT                    StreamCount,
    const DXVAHD_STREAM_DATA* pStreams
);
```

Thus, implementations of the video composition model 200, as described above, provide for a flexible mechanism to process a wide range of input video and/or graphic streams, each possible having differing characteristics in a computing device.

Figure 3:
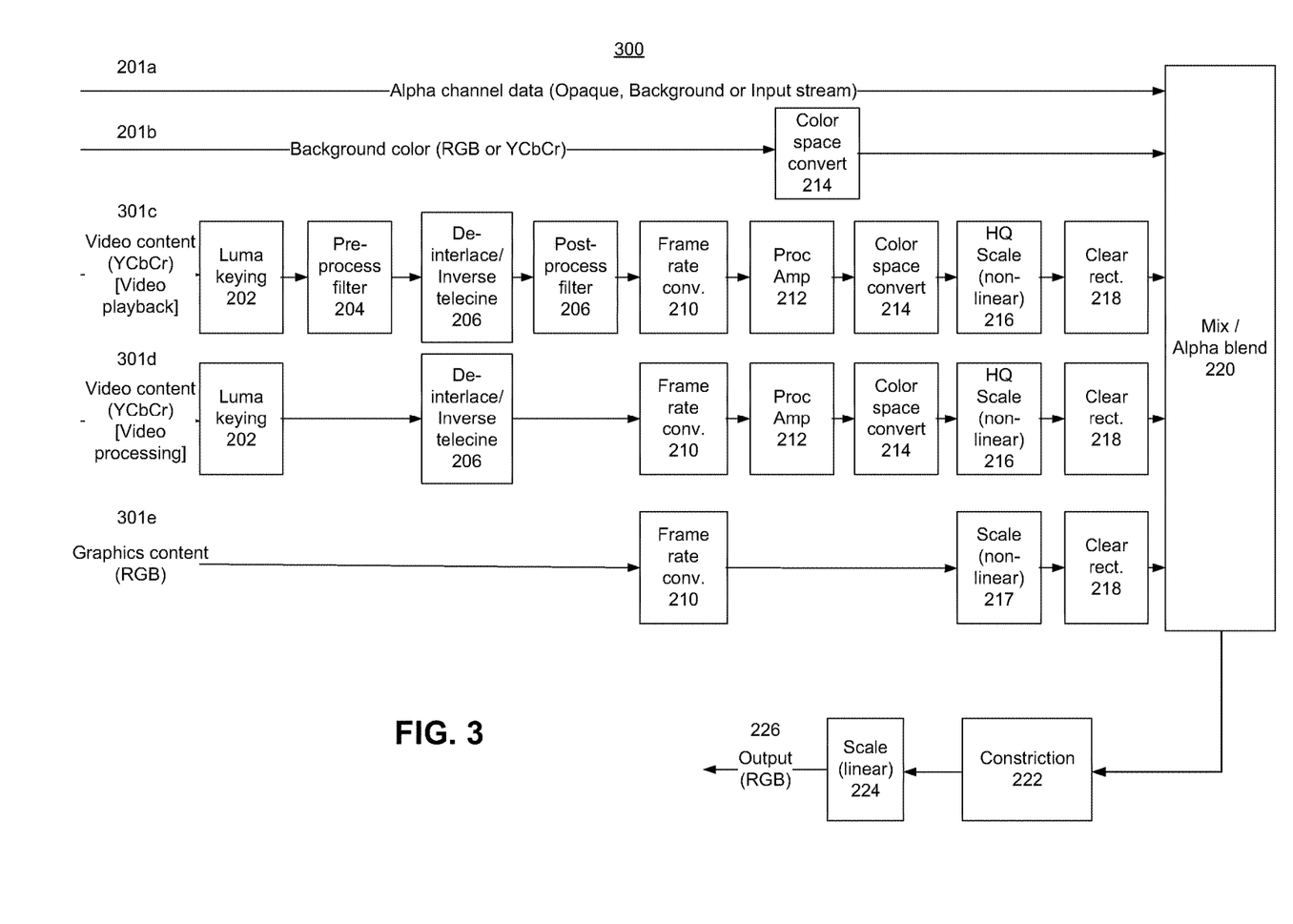
FIG. 3 illustrates the video composition model of FIG. 2 for video contents encoded in the YCbCr color space and for graphics rendered in the RGB color space.

FIG. 3 illustrates the video composition model of FIG. 2 for video contents encoded in the YCbCr color space and for graphics rendered in the RGB color space. Such encoding is common in optical formats. Thus, main video content 301*c* and sub-video content 301*d* are shown as having a color-space of YCbCr, and graphics content 301*e* is shown as having a color-space of RBG. Other processing in FIG. 3 may be performed as described above with regard to FIG. 2.

Figure 4:
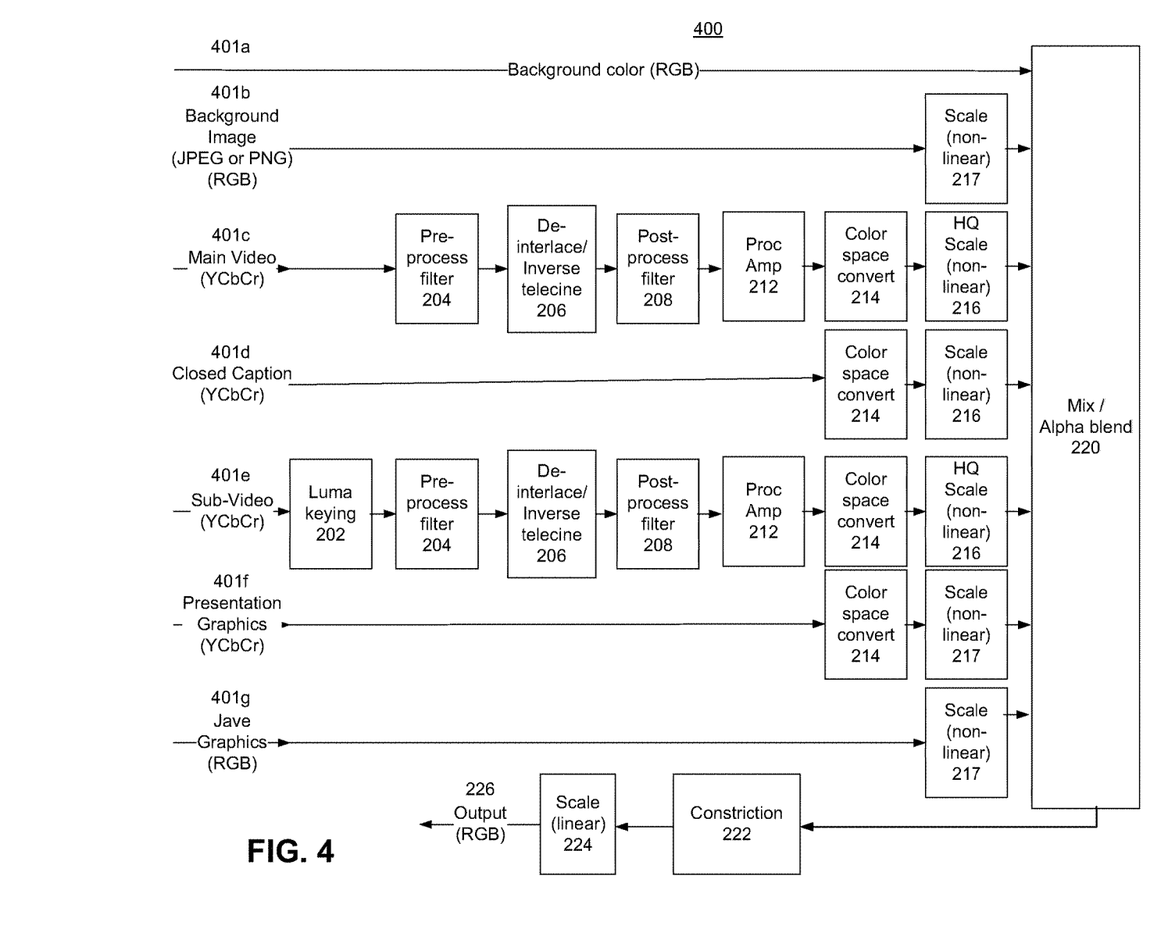
FIG. 4 illustrates the video composition model of FIG. 2 for High-Definition video

FIG. 4 illustrates the video composition model of FIG. 2 for a Blu-ray (BD-J) application. A background color 401*a* and/or background image 401*b* may be input to the video composition model 400. The background image 401*b* may be a JPEG or PNG image specified in an RGB color-space. Main video 401*c*, closed caption 401*d*, sub-video 401*e*, or presentation graphics 401*f* may be input in a YCbCr color-space, and processed by various of blocks 202-217, as necessary and/or specified by a video application through the APIs 104 of the 3D APIs 106. Jave graphics 401*g* may be input in an RGB color space and scaled using scale block 217. Other processing in FIG. 4 may be performed as described above with regard to FIG. 2.

In some implementations of the video composition model 400, a lowest Z-ordered input stream may be used as the background image input 401*b*. In some implementations, YCbCr background colors may be specified in addition to an RGB background color with the color space specified on the output using an interface provided by the model.

Table 1 below provides exemplary specifications of the inputs and outputs to the video composition model 400 for Blu-ray applications.

TABLE 1

| Plane | Usage |
|---|---|
| Background | 720 × 480~1920 × 1080, RGB single color or single image (JPEG or PNG) |
| Main Video | 720 × 480~1920 × 1080, YCbCr 12-bit/pixel, progressive or interlaced |
| Closed Caption | 720 × 480~1920 × 1080, YChCr 8-bit palettized with 8-bit alpha |
| Sub Video | 720 × 480~1920 × 1080, YCbCr 12-bit/pixel, progressive or interlaced, luma keying |
| Presentation Graphics | 720 × 480~1920 × 1080, YCbCr 8-bit palettized (24-bit color + 8-bit alpha) |
| Jave Graphics | 720 × 480~1920 × 1080, RGB 32-bit/pixel |

Figure 5:
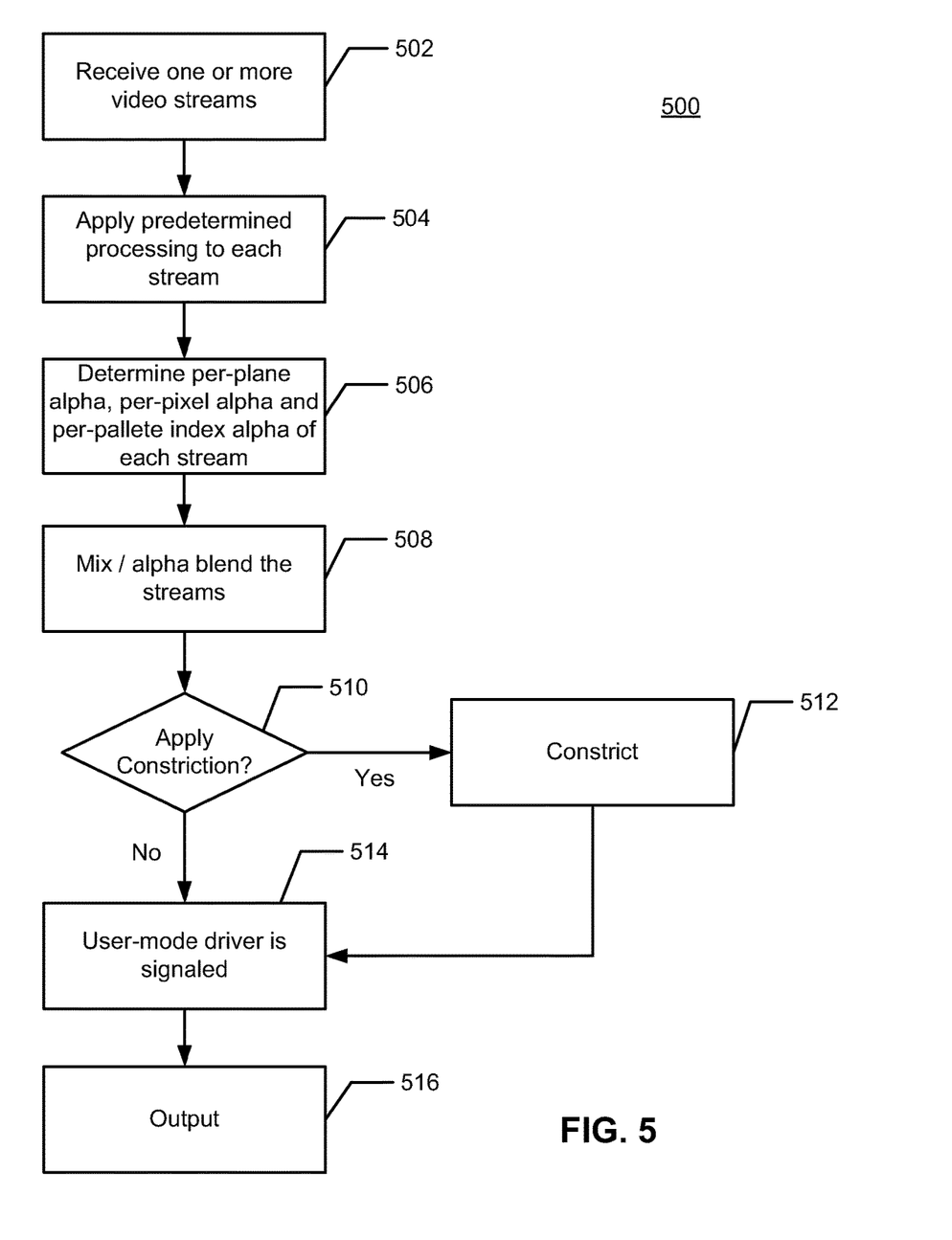
FIG. 5 illustrates an operational flow diagram of a video composition model.

FIG. 5 is an operational flow of an implementation of a process to receive and process video content. At 502, one or more video streams are received. The video composition model 200 may receive from the device driver 101 an indication of the number of streams, a color space of each stream, a frame rate of each stream, a background color, or alpha channel data. At 504, processing is applied to each stream. This may be any predetermined combination of blocks 202-218 that are applied to the input stream, as described above with respect to FIG. 2.

At 506, per-plane alpha, per-pixel alpha and per-pallete index alpha may be applied to each stream. The video application may specify how the alpha channel data is to be filled out on the target rectangle for application to the output video. At 508, mixing/alpha-blending of the input streams may be performed. The mix block 220 may performed per-plane and per-pixel alpha blending of the input streams on top of a background color. At 510, it is determined if constriction is to be applied to the output video. The video application may call for a level of protection to be applied to the output video if the graphics hardware does not provide an appropriated level of content protection. If constriction is to be applied, then at 512, a video quality of the output video may be reduced. If constriction is not to be applied, then the video driver 101 may be signaled to prepare to output the output video at 514. Likewise, after constriction at 512, the video driver 101 may be signaled at 514. At 516, the output video is made available. For example, the output video may be communicated to the display device 120.

Exemplary Computing Arrangement

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc, may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed on a computing device, the method comprising:
configuring a video composition model executing on the computing device to expose an application programming interface (API) to a video playback application that executes on the computing device, the API being configured to enable the video playback application to control processing by the video composition model and composition of an output video stream;
receiving at least one input video stream at a discrete data input (DDI) of the video composition model;
receiving processing specifications for the at least one input video stream from the video playback application at the API; and
processing, by the video composition model, each of the at least one input video stream according to the received processing specifications, the processing comprising:
converting a color space of the each of the at least one input video stream to a designated color space in response to the color space differing from the designated color space, where the designated color space is designated by the received processing specifications, and scaling a resolution of the each of the at least one input video stream to a designated resolution in response to the resolution differing from the designated resolution, where the designated resolution is designated by the received processing specifications, wherein the processing of the least one input video stream and composition of the output video stream is performed in a single pass by the video composition model.

2. The method of claim 1 further comprising querying, by the video composition model via a device driver, capabilities of a graphics device associated with the device driver.

3. The method of claim 1 further comprising providing, by the video composition model, at least one application programming interface configured for enabling the video playback application and a device driver to establish proprietary content protection.

4. The method of claim 1 where the video composition model is configured for alpha blending a plurality of the at least one video stream.

5. The method of claim 1 where the video composition model is configured for reducing a quality of the at least one video stream.

6. The method of claim 1 where the video composition model is configured for performing linear scaling of the at least one video stream.

7. The method of claim 1 where the video composition model is configured for performing non-linear scaling of the at least one video stream.

8. At least one computer storage device storing computer-executable instructions that, when executed by a computing device, cause the computing device to perform actions comprising:

configuring a video composition model executing on the computing device to expose an application programming interface (API) to a video playback application that executes on the computing device, the API being configured to enable the video playback application to control processing by the video composition model and composition of an output video stream;

receiving at least one input video stream at a discrete data input (DDI) of the video composition model;

receiving processing specifications for the at least one input video stream from the video playback application at the API; and processing, by the video composition model, each of the at least one input video stream according to the received processing specifications, the processing comprising:

converting a color space of the each of the at least one input video stream to a designated color space in response to the color space differing from the designated color space, where the designated color space is designated by the received processing specifications, and scaling a resolution of the each of the at least one input video stream to a designated resolution in response to the resolution differing from the designated resolution, where the designated resolution is designated by the received processing specifications, wherein the processing of the least one input video stream and composition of the output video stream is performed in a single pass by the video composition model.

9. The at least one computer storage device of claim 8, the actions further comprising querying, by the video composition model via a device driver, capabilities of a graphics device associated with the device driver.

10. The at least one computer storage device of claim 8, the actions further comprising providing, by the video composition model, at least one application programming interface configured for enabling the video playback application and a device driver to establish proprietary content protection.

11. The at least one computer storage device of claim 8 where the video composition model is configured for alpha blending a plurality of the at least one video stream.

12. The at least one computer storage device of claim 8 where the video composition model is configured for reducing a quality of the at least one video stream.

13. The at least one computer storage device of claim 8 where the video composition model is configured for performing linear scaling of the at least one video stream.

14. The at least one computer storage device of claim 8 where the video composition model is configured for performing non-linear scaling of the at least one video stream.

15. A system comprising a computing device and at least one program module together configured for performing actions comprising:

configuring a video composition model executing on the computing device to expose an application programming interface (API) to a video playback application that executes on the computing device, the API being configured to enable the video playback application to control processing by the video composition model and composition of an output video stream;

receiving at least one input video stream at a discrete data input (DDI) of the video composition model;

receiving processing specifications for the at least one input video stream from the video playback application at the API; and processing, by the video composition model, each of the at least one input video stream according to the received processing specifications, the processing comprising:

converting a color space of the each of the at least one input video stream to a designated color space in response to the color space differing from the designated color space, where the designated color space is designated by the received processing specifications, and scaling a resolution of the each of the at least one input video stream to a designated resolution in response to the resolution differing from the designated resolution, where the designated resolution is designated by the received processing specifications, wherein the processing of the least one input video stream and composition of the output video stream is performed in a single pass by the video composition model.

16. The system of claim 15, the actions further comprising querying, by the video composition model via a device driver, capabilities of a graphics device associated with the device driver.

17. The system of claim 15, the actions further comprising providing, by the video composition model, at least one application programming interface configured for enabling the video playback application and a device driver to establish proprietary content protection.

18. The system of claim 15 where the video composition model is configured for alpha blending a plurality of the at least one video stream.

19. The system of claim 15 where the video composition model is configured for reducing a quality of the at least one video stream.

20. The system of claim 15 where the video composition model is configured for performing linear scaling of the at least one video stream, or where the video composition model is configured for performing non-linear scaling of the at least one video stream.

* * * * *